(12) United States Patent
Lee et al.

(10) Patent No.: US 12,524,840 B2
(45) Date of Patent: Jan. 13, 2026

(54) METHOD FOR CORRECTING COLORED IMAGE USING ARTIFICIAL NEURAL NETWORK, AND DEVICE THEREFOR

(71) Applicants: NAVER WEBTOON LTD., Seongnam-si (KR); KOREA ADVANCED INSTITUTE OF SCIENCE AND TECHNOLOGY, Daejeon (KR)

(72) Inventors: Kwang Jin Lee, Seongnam-si (KR); Jae Gul Choo, Daejeon (KR); Eung Yeup Kim, Daejeon (KR); Sang Hyeon Lee, Daejeon (KR); Jeong Hoon Park, Daejeon (KR); So Mi Choi, Daejeon (KR)

(73) Assignees: NAVER WEBTOON LTD., Seongnam-si (KR); Korea Advanced Institute of Science and Technology, Daejeon (KR)

( * ) Notice: Subject to any disclaimer, the term of this patent is extended or adjusted under 35 U.S.C. 154(b) by 172 days.

(21) Appl. No.: 18/506,520

(22) Filed: Nov. 10, 2023

(65) Prior Publication Data

US 2024/0193741 A1     Jun. 13, 2024

Related U.S. Application Data

(63) Continuation of application No. PCT/KR2022/006668, filed on May 10, 2022.

(30) Foreign Application Priority Data

May 10, 2021     (KR) .......................... 10-2021-0060331

(51) Int. Cl.
*G06T 5/60*     (2024.01)
*G06F 3/048*    (2013.01)
(Continued)

(52) U.S. Cl.
CPC .................. *G06T 5/60* (2024.01); *G06T 7/13* (2017.01); *G06T 7/90* (2017.01); *G06T 11/001* (2013.01);
(Continued)

(58) Field of Classification Search
CPC .. G06T 5/60; G06T 7/13; G06T 7/174; G06T 7/90; G06T 11/001; G06T 2200/24;
(Continued)

(56) References Cited

U.S. PATENT DOCUMENTS 9,251,572 B2    2/2016  Shu et al.
2022/0122299 A1 4/2022  Levinshtein et al.
(Continued)

FOREIGN PATENT DOCUMENTS

KR    1020110017274 A    2/2011
KR    1020160036662 A    4/2016
(Continued)

OTHER PUBLICATIONS

Min Shi et al. "Deep Line Art Video Colorization with a Few References"; Mar. 30, 2020, arXiv:2003.10685v2 [cs.CV] (Year: 2020).*

(Continued)

*Primary Examiner* — Wesner Sajous
(74) *Attorney, Agent, or Firm* — Greer Burns & Crain Ltd.

(57) ABSTRACT

A method of correcting a colored image includes obtaining a colored image by inputting a sketch image to a first artificial neural network, receiving user input data for a target area in the colored image, and obtaining a corrected image in which a color state of the target area has been changed, by inputting the sketch image and the user input data to a second artificial neural network.

9 Claims, 11 Drawing Sheets

(51) Int. Cl.
*G06N 3/04* (2023.01)
*G06T 7/13* (2017.01)
*G06T 7/90* (2017.01)
*G06T 11/00* (2006.01)
*G06T 11/20* (2006.01)
*G06V 10/75* (2022.01)
*G09G 5/02* (2006.01)
*H04N 1/60* (2006.01)
*H04N 5/57* (2006.01)

(52) U.S. Cl.
CPC .............. *G06T 2200/24* (2013.01); *G06T 2207/10024* (2013.01); *G06T 2207/20081* (2013.01); *G06T 2207/20084* (2013.01); *G06T 2207/20092* (2013.01)

(58) Field of Classification Search
CPC . G06T 2207/10024; G06T 2207/20081; G06T 2207/20084; G06T 2007/20092; G06T 3/407; G06T 11/20; G06T 11/206; G06T 11/40; G06T 11/80; G06F 3/048; G06F 3/048462; G06N 3/042; G06N 3/045; G06N 3/08; G06N 3/0464; G06V 10/75–80; G06V 10/70; G09G 5/02; G09G 5/06; G09G 5/10; H04N 1/60; H04N 5/57–58; H04N 9/64–69
See application file for complete search history.

(56) References Cited

U.S. PATENT DOCUMENTS

2022/0139000 A1    5/2022   Park et al.
2024/0127509 A1*   4/2024   Hold-Geoffroy ..... G06T 3/4046

FOREIGN PATENT DOCUMENTS

KR    1020200057770 A    5/2020
KR    1020210009922 A    1/2021

OTHER PUBLICATIONS

ISR issued in PCT/KR2022/006668, mailed Aug. 10, 2022.
Notice of Allowance issued in Korean patent application No. KR 10-2021-0060331, dated Jul. 21, 2023.
Hae-Hyun Cho; "Face Recognition by Learning Data Configuration"; Proceedings of the Korean Society of Computer Information Conference; pp. 395-396; Jan. 16, 2019.
Min Shi et al; "Deep Line Art Video Colorization with a Few References"; arXiv: 2003.10685v2 [cs.CV], pp. 1-10; Mar. 30, 2020.

* cited by examiner

METHOD FOR CORRECTING COLORED IMAGE USING ARTIFICIAL NEURAL NETWORK, AND DEVICE THEREFOR

CROSS-REFERENCE TO RELATED APPLICATIONS

This is a continuation application of International Application No. PCT/KR2022/00668, filed May 10, 2022, which claims the benefit of Korean Patent Application No. 10-2021-0060331, filed May 10, 2021.

BACKGROUND OF THE INVENTION

Field of Invention

The present disclosure relates to a method and an apparatus for correcting a color bleeding effect in a colored image by using an artificial neural network.

Description of Related Art

With the development of artificial intelligence technology, an image coloring model for automatically coloring a black-and-white picture to a color picture has been developed. However, a method of coloring an image by using an artificial neural network operates similarly to a paint tool, and thus, when a boundary of the image is unclear, color bleeding may occur.

The aforementioned background technology is technical information possessed by the inventor for derivation of the present disclosure or acquired by the inventor during the derivation of the present disclosure, and is not necessarily prior art disclosed to the public before the application of the present disclosure.

BRIEF SUMMARY OF THE INVENTION

Embodiments of the present disclosure provide a method and an apparatus for correcting a colored image in which a color bleeding effect has occurred, by using an artificial neural network.

A method of correcting a colored image, according to an embodiment of the present disclosure, includes obtaining a colored image by inputting a sketch image to a first artificial neural network, receiving user input data for a target area in the colored image, and obtaining a corrected image in which a color state of the target area has been changed, by inputting the sketch image and the user input data to a second artificial neural network.

According to an embodiment, the colored image may include at least a partial area where a color bleeding effect has occurred, and when the target area corresponds to the partial area, the changed color state of the target area may be a state in which the color bleeding effect in the partial area has been alleviated.

According to an embodiment, the obtaining of the colored image may include inputting the sketch image and color information of the sketch image to the first artificial neural network and obtaining the colored image output from the first artificial neural network, and the first artificial neural network may determine color states of individual areas included in the sketch image, based on the color information.

According to an embodiment, the receiving of the user input data may include receiving scribble input data for the target area.

According to an embodiment, the method may further include generating pseudo user input data by detecting boundaries of a plurality of colored images generated based on the sketch image, and training the second artificial neural network by using the pseudo user input data and the sketch image.

According to an embodiment, the generating of the pseudo user input data may include detecting a boundary of a first colored image in which a color bleeding effect has occurred and a boundary of a second colored image in which a color bleeding effect has not occurred, from among the plurality of colored images generated based on the sketch image, and generating the pseudo user input data by comparing the boundary of the first colored image with the boundary of the second colored image.

According to an embodiment, the generating of the pseudo user input data may include detecting a different boundary area between the boundary of the first colored image and the boundary of the second colored image, and generating Sobel filter mask data corresponding to the detected boundary area.

According to an embodiment, the training of the second artificial neural network may include training the second artificial neural network by using the sketch image and the pseudo user input data as input data and the second colored image as target data.

According to an embodiment, the training of the second artificial neural network may include training the second artificial neural network such that a gap between the boundary of the first colored image and the boundary of the second colored image is minimized by using an objective function for reducing the gap.

According to an embodiment, the detecting of the boundaries may include detecting the boundaries of the plurality of colored images by using a Sobel filter.

According to an embodiment, the second artificial neural network includes a convolution layer and at least some layers of the first artificial neural network, wherein the sketch image and the user input data may be input to the convolution layer, and output data of the convolution layer may be input data of the at least some layers of the first artificial neural network.

An apparatus for correcting a colored image, according to another embodiment of the present disclosure, includes a processor, wherein the processor is configured to obtain a colored image by inputting a sketch image to a first artificial neural network, receive user input data for a target area of the colored image, and obtain a corrected image in which a color state of the target area has been changed, by inputting the sketch image and the user input data to a second artificial neural network.

According to an embodiment, the processor may be further configured to input the sketch image and color information of the sketch image to the first artificial neural network and obtain the colored image output from the first artificial neural network, and the first artificial neural network may determine color states of individual areas included in the sketch image, based on the color information.

According to an embodiment, the processor may be further configured to generate pseudo user input data by detecting boundaries of a plurality of colored images generated based on the sketch image and train the second artificial neural network by using the pseudo user input data and the sketch image.

According to an embodiment, the processor may be further configured to detect a boundary of a first colored image in which a color bleeding effect has occurred and a boundary of a second colored image in which a color bleeding effect has not occurred, from among the plurality of colored images generated based on the sketch image, and generate the pseudo user input data by comparing the boundary of the first colored image with the boundary of the second colored image.

According to an embodiment, the processor may be further configured to train the second artificial neural network by using the sketch image and the pseudo user input data as input data and the second colored image as target data.

According to an embodiment, the processor may be further configured to train the second artificial neural network such that a gap between the boundary of the first colored image and the boundary of the second colored image is minimized by using an objective function for reducing the gap.

According to an embodiment, the processor may be further configured to detect the boundaries of the plurality of colored images by using a Sobel filter.

Other aspects, features, and advantages may become clear from the following drawings, the claims, and the detailed description of the present disclosure.

Embodiments of the present disclosure provide a method and an apparatus for correcting a colored image in which a color bleeding effect has occurred, by using an artificial neural network.

DETAILED DESCRIPTION OF THE INVENTION

Figure 1:
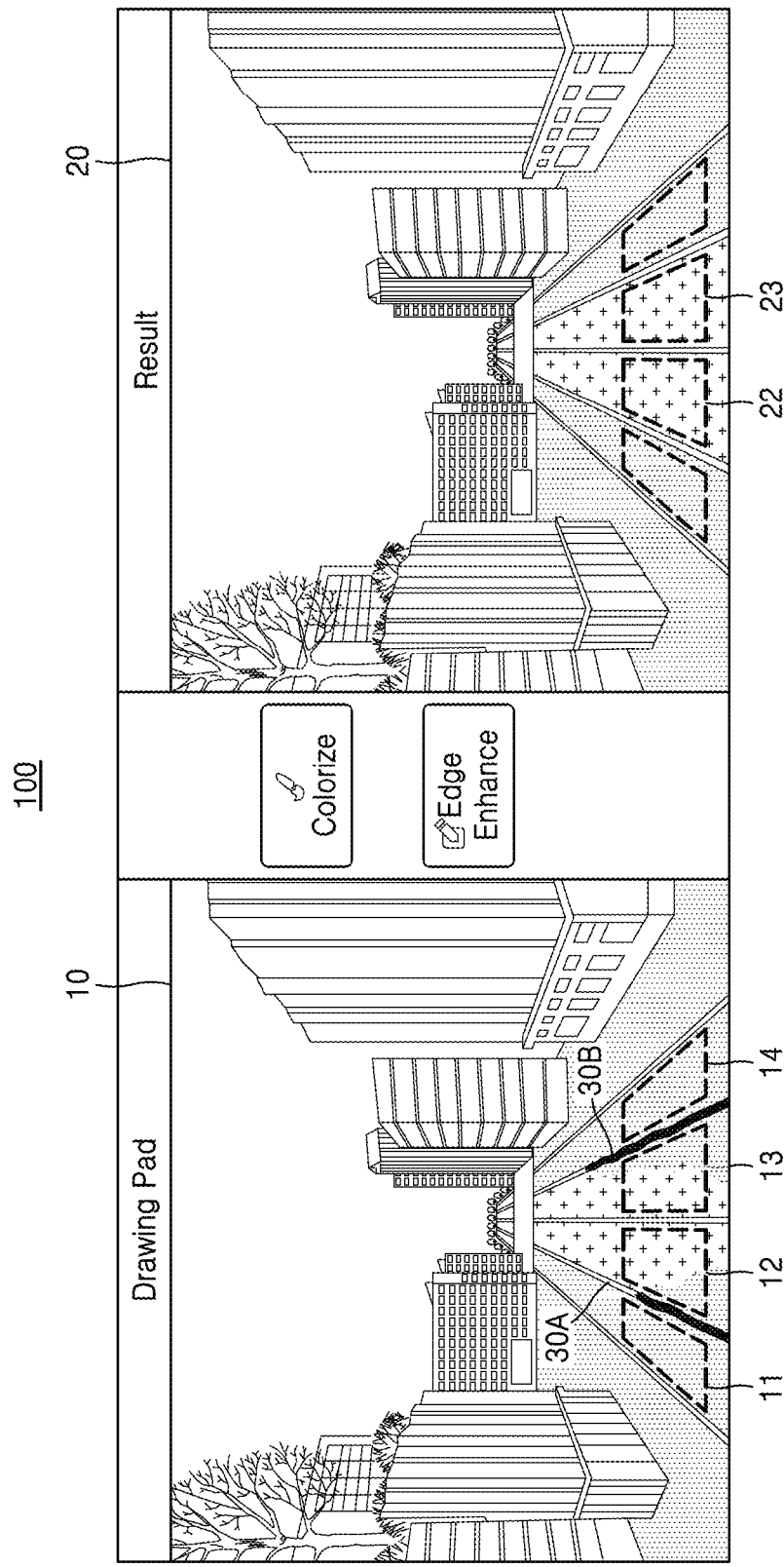
FIG. 1 is a diagram illustrating an example of a graphical user interface (GUI) of a display of an apparatus for correcting a colored image, according to an embodiment of the present disclosure.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein should be defined based on the meaning of the terms together with the description throughout the specification.

Embodiments may have various modifications and various forms, and some embodiments are illustrated in the drawings and are described in detail. However, this is not intended to limit the embodiments to particular modes of practice, and it will be understood that all changes, equivalents, and substitutes that do not depart from the spirit and technical scope of the embodiments are encompassed in the present disclosure. Also, the terms used in the present specification are only used to describe the embodiments, and are not intended to limit the embodiments.

Unless defined otherwise, the terms used in the embodiments have the same meanings as those generally understood by one of ordinary skill in the art. Terms that are defined in commonly used dictionaries should be interpreted as having meanings consistent with those in the context of the related art, and should not be interpreted in ideal or excessively formal meanings unless clearly defined in the embodiments.

Artificial intelligence (AI) described in the present disclosure may denote a field of studying artificial intelligence or a methodology of manufacturing artificial intelligence, and machine learning is one field of artificial intelligence technology. Machine learning is a technical method enabling a computing device to learn through data to understand a specific target or condition or to find and classify a pattern of data, and may be an algorithm enabling a computer to analyze data. Machine learning described in the present disclosure may be understood as including an operating method for training an artificial intelligence model.

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

Hereinafter, various embodiments of the present disclosure will be described in detail with reference to accompanying drawings to enable one of ordinary skill in the art to easily execute the present disclosure.

FIG. 1 is a diagram illustrating an example of a graphical user interface (GUI) of a display of an apparatus for correcting a colored image, according to an embodiment of the present disclosure.

Referring to FIG. 1, a target colored image 10 to be corrected and a corrected image 20 that has been corrected may be displayed on a display of an apparatus 100 for correcting a colored image, and according to some embodiments, a user interface (UI) object for performing coloring and/or a UI object for performing correction may be further displayed. According to an embodiment, the apparatus 100 may obtain the target colored image 10 from an external server. According to another embodiment, the apparatus 100 may perform coloring on a sketch image and obtain the target colored image 10 described above as a result. The apparatus 100 according to some embodiments may obtain the target colored image 10 that has been colored by using an artificial intelligence network. In this case, the type and the structure of the artificial intelligence network for coloring the sketch image and/or a black-and-white image are not limited, and for example, the artificial intelligence network may be a convolutional neural network (CNN)-based model.

Referring to the target colored image 10, when a color bleeding effect has occurred, at least a portion of each area may be colored by a color of another adjacent area. The apparatus 100 may receive a user input regarding an area where color bleeding has occurred, through an input/output interface or a separate input/output device.

According to an embodiment, the apparatus 100 may obtain the target colored image 10 where color bleeding has occurred. Referring to FIG. 1, a color of an area 11 is colored on a portion of an area 12, and a color of an area 14 is colored on a portion of an area 13. A user may identify an area of the target colored image 10, where color bleeding has occurred. In this case, the apparatus 100 may receive user inputs 30A and 30B of selecting color bleeding areas.

Then, in response to a user input, the apparatus 100 may correct the target colored image 10 such that the color bleeding is alleviated. Also, the apparatus 100 may display the corrected image 20 in which the color bleeding is alleviated as shown in areas 22 and 23. This will be described in detail below with reference to a related drawing.

Hereinafter, the apparatus 100 for correcting a colored image will be described in detail with reference to FIG. 2.

According to an embodiment, the apparatus 100 for correcting a colored image may include a memory 101, a processor 102, a communication module 103, and an input/output interface 104.

According to an embodiment, the memory 101 is a computer-readable recording medium, and may include random access memory (RAM), read-only memory (ROM), and a permanent mass storage device such as a disk drive. Also, the memory 101 may temporarily or permanently store program code and configuration for controlling the apparatus 100, a camera image, and pose data of an object.

The processor 102 may be configured to process an instruction of a computer program by performing basic arithmetic, logic, and input/output operations. The instruction may be provided to the processor 102 by the memory 101 or the communication module 103. For example, the processor 102 may be configured to execute a received instruction according to program code stored in a recording device, such as the memory 101.

The communication module 103 may provide a function for communicating with an external server through a network. For example, a request generated by the processor 102 of the apparatus 100 according to program code stored in a recording medium, such as the memory 101, may be transmitted to the external server through the network, according to a control by the communication module 103. On the other way around, a control signal, an instruction, content, a file, or the like provided according to a control by a processor of the external server may be received by the apparatus 100 through the communication module 103 via the network. For example, the control signal or the instruction of the external server received through the communication module 103 may be transmitted to the processor 102 or the memory 101, and the content or the file may be stored in a storage medium that may be further included in the apparatus 100.

Also, the communication module 103 may communicate with the external server through the network. A communication method is not limited, but the network may be a short-range wireless communication network. For example, the network may be a Bluetooth, Bluetooth low energy (BLE), or Wi-Fi communication network.

The input/output interface 104 may be a unit for an interface with an input/output device. For example, an input device may include a device such as a keyboard or a mouse, and an output device may include a device such as a display for displaying a communication session of an application. As another example, the input/output interface 104 may be a unit for an interface with a device in which functions for input and output are integrated, such as a touch screen. In detail, while the processor 102 of the apparatus 100 processes an instruction of a computer program loaded onto the memory 101, a service screen or content configured by using data may be displayed on a display through the input/output interface 104.

Figure 2:
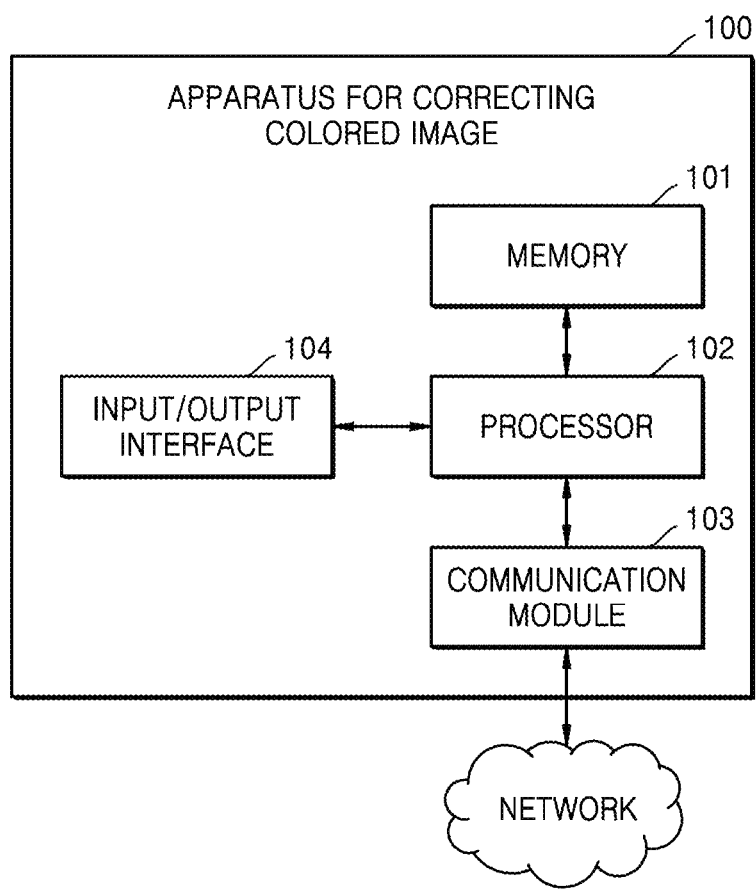
FIG. 2 is a block diagram for describing an internal configuration of an apparatus for correcting a colored image, according to an embodiment of the present disclosure.

Also, according to other embodiments, the apparatus 100 may include more components than those shown in FIG. 2. For example, the apparatus 100 may include a battery or charging device for supplying power to components therein, may be implemented to include at least a part of the input/output device, or may further include other component, such as a transceiver, a global positioning system (GPS) module, various sensors, and a database.

Figure 3:
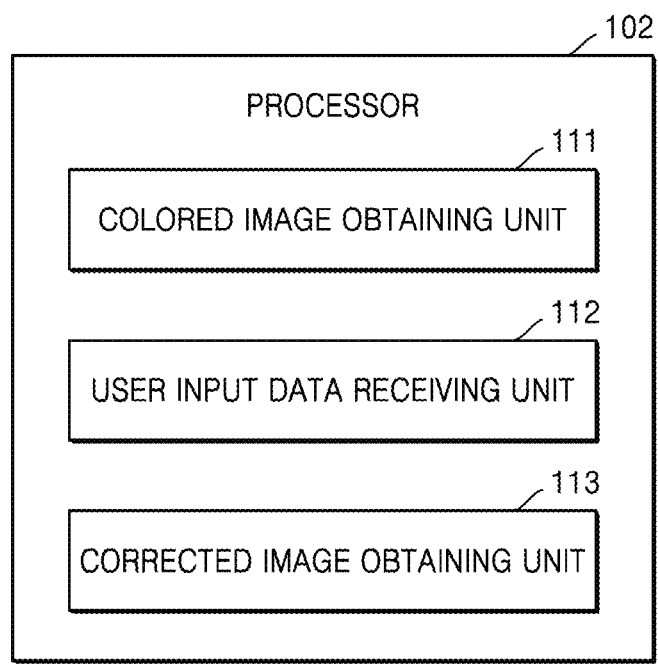
FIG. 3 illustrates an internal configuration of a processor, according to an embodiment of the present disclosure.

Hereinafter, an internal configuration of the processor 102 of the apparatus 100 for correcting a colored image, according to an embodiment of the present disclosure, will be described in detail with reference to FIG. 3. For convenience of understanding, a processor is described as if the processor is the processor 102 of the apparatus 100 of FIG. 2, but it should be noted that, when correcting of a color image is performed by an external server, according to an embodiment, the processor may be a processor of the external server.

The processor 102 of the apparatus 100 for correcting a colored image, according to an embodiment of the present disclosure, includes a colored image obtaining unit 111, a user input data receiving unit 112, and a corrected image obtaining unit 113. According to some embodiments, the components of the processor 102 may be selectively included in or excluded from the processor 102. Also, according to some embodiments, the components of the processor 102 may be separated or combined for representation of functions of the processor 102.

Figure 4:
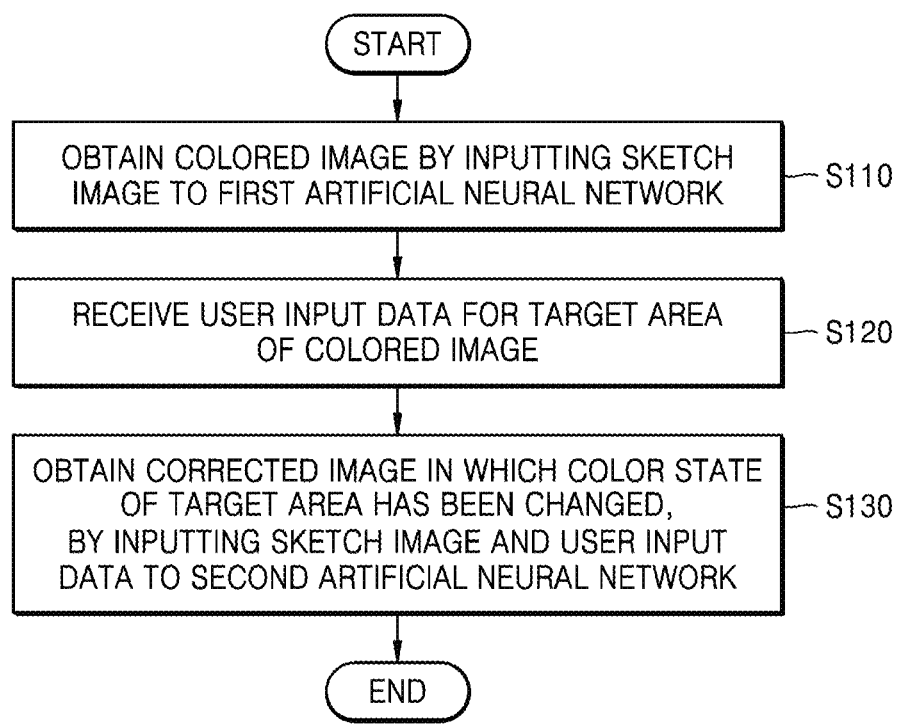
FIGS. 4 and 5 are flowcharts of a method of correcting a colored image, according to an embodiment of the present disclosure.

The processor 102 and the components of the processor 102 may control the apparatus 100 to perform operations S110 through S130 included in a method of correcting a colored image of FIG. 4. For example, the processor 102 and the components of the processor 102 may be implemented to execute instructions according to code of an operating system or code of at least one program included in the memory 101. Here, the components of the processor 102 may be representations of different functions of the processor 102, which are performed by the processor 102 according to instructions provided by the program code stored in the apparatus 100. For example, the processor 102 may provide artificial neural network functionality to form a first artificial neural network and a second artificial neural network. An internal configuration and detailed operations of the processor 102 will be described with reference to a method of correcting a colored image of FIGS. 4 and 5 and embodiments of FIGS. 6 through 11.

FIG. 4 is a diagram showing, in time-series, a method of correcting a colored image, according to an embodiment of the present disclosure.

In operation S110, the apparatus 100 for correcting a colored image may obtain a colored image by inputting a sketch image to a first artificial neural network, which is implemented using the processor 102.

According to an embodiment, the colored image may include at least a partial area in which a color bleeding effect has occurred. The color bleeding effect is a phenomenon in which a color bleeds through a boundary at a boundary region of an image observed as a result of coloring a colored image.

According to an embodiment, the apparatus 100 may input the sketch image and color information of the sketch image to the first artificial neural network, and obtain the colored image output from the first artificial neural network. The first artificial neural network may be a CNN-based artificial intelligence network trained based on a plurality of sketch images and a colored image corresponding to each of the plurality of sketch images. Also, the first artificial neural network may determine color states of individual areas included in the sketch image, based on the color information.

In operation S120, the apparatus 100 may receive user input data for a target area of the colored image.

The apparatus 100 may receive scribble input data for at least a partial area of an area where the colored image is displayed. The scribble input data may include various types of user input data for designating a line or an area, and for example, may be similar to a drag input, a pinch-in input, or a pinch-out input. According to an embodiment, the apparatus 100 may include an interface for scribbling a user input. In this case, the apparatus 100 may receive a user input of scribbling the partial area through the interface 104. For example, the apparatus 100 may receive the scribble input data through a touch screen, receive the scribble input data through a mouse or a trackpad, or receive the scribble input data by using a separate terminal performing network communication.

In operation S130, the apparatus 100 may obtain a corrected image in which a color state of the target area has been changed, by inputting the sketch image and the user input data to a second artificial neural network, which is implemented using the processor 102. When the target area where the user input data has been received corresponds to an area where a color bleeding effect has occurred, according to an embodiment, the apparatus 100 may obtain the corrected image in which the color bleeding effect is alleviated. The apparatus 100 according to some embodiments of the present disclosure may generate pseudo user input data to train the second artificial neural network. This will be described in detail below with reference to FIG. 5 below.

Figure 5:
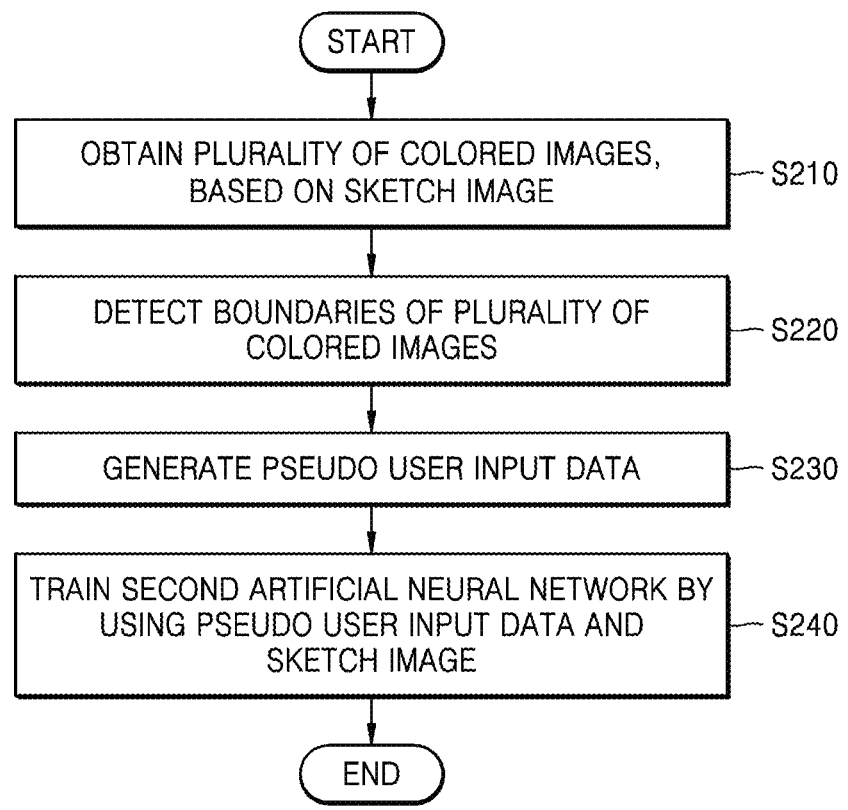

A method of training the second artificial intelligence network for correcting a colored image will be described with reference to FIG. 5.

In operation S210, the apparatus 100 for correcting a colored image may obtain a plurality of colored images generated based on a sketch image. The plurality of colored images may be training data used to train the second artificial intelligence network. Accordingly, a method of generating the plurality of colored images or a method of obtaining the plurality of colored images may vary. For example, the colored image may be an image obtained by inputting the sketch image to the first artificial intelligence network. At this time, the first artificial neural network may be a CNN-based artificial intelligence network trained based on a plurality of sketch images and a colored image corresponding to each of the plurality of sketch images. Alternatively, according to some embodiments, the apparatus 100 may obtain a colored image from an external server. For example, a colored image may be a picture or a work drawn by an artist. Alternatively, a colored image may be an image colored by using a paint tool of a drawing board. In the paint tool, a coloring area is designated by recognizing a sketch line and a boundary line of a drawing in a sketch image. Thus, when the sketch line or the boundary line of the image is unclear, color bleeding may occur.

In operation S220, the apparatus 100 may detect boundaries of the plurality of colored images. A method of detecting a boundary of a colored image is not limited, and the apparatus 100 according to an embodiment of the present disclosure may detect the boundaries of the plurality of colored images by using a Sobel filter. Then, in operation S230, the apparatus 100 may generate pseudo user input data.

The apparatus 100 according to an embodiment of the present disclosure may detect a boundary of a first colored image in which a color bleeding effect has occurred and a boundary of a second colored image in which a color bleeding effect has not occurred, from among the plurality of colored images, and generate the pseudo user input data by comparing the boundary of the first colored image with the boundary of the second colored image.

Also, according to an embodiment, the apparatus 100 may detect a boundary area where the boundary of the first colored image and the boundary of the second colored image are different from each other, and generate the pseudo user input data corresponding to the detected boundary area.

Also, in operation S240, the apparatus 100 may train the second artificial neural network by using the pseudo user input data and the sketch image.

In detail, the apparatus 100 may train the second artificial neural network by using the sketch image and the pseudo user input data as input data and using the second colored image in which a color bleeding effect has not occurred as target data.

Also, the apparatus 100 according to an embodiment of the present disclosure may train the second artificial neural network such that a gap between the boundary of the first colored image and the boundary of the second colored image is minimized by using an objective function for reducing the gap.

At this time, the structure of the second artificial neural network is not limited, but according to some embodiments of the present disclosure, the second artificial neural network may be configured to include a convolution layer to which the sketch image and the user input data are input, and at least some layers of the first artificial neural network that is an automatic coloring artificial intelligence network. Also, in this case, output data of the convolution layer may be used as input data of the at least some layers of the first artificial neural network. This will be described in detail below with reference to a related drawing.

Hereinafter, the first artificial neural network and the second artificial neural network, according to an embodiment of the present disclosure, will be described in detail with reference to FIGS. 6 and 7.

Figure 6:
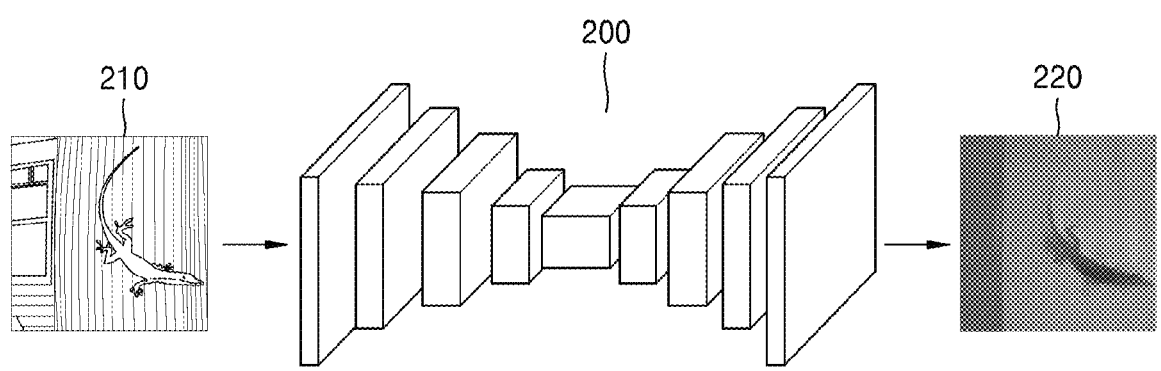
FIG. 6 is a diagram for describing an artificial neural network for coloring a black-and-white image.
Figure 7:
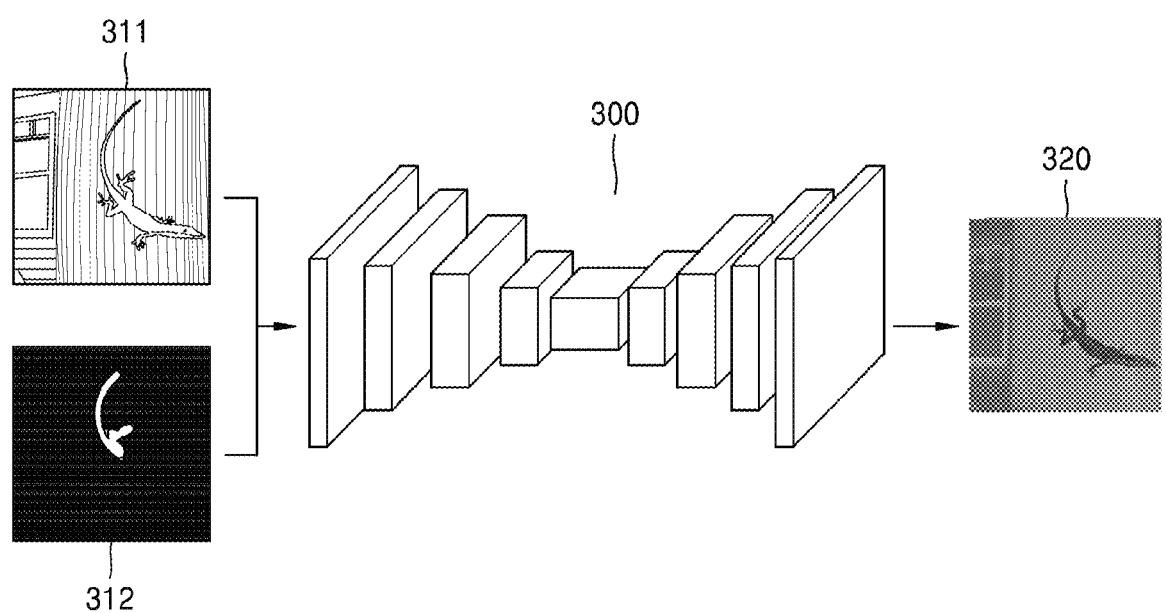
FIG. 7 is a diagram for describing an artificial neural network for generating a corrected colored image, according to an embodiment of the present disclosure.

FIG. 6 illustrates an example of a structure of the first artificial neural network for coloring a sketch image or a black-and-white image. According to some embodiments of the present disclosure, the apparatus 100 may obtain a colored image 220 in which automatic coloring is completed by inputting a sketch image or black-and-white image 210 to a first artificial intelligence network 200, before correcting a color bleeding effect of a colored image. In this case, the obtained colored image 220 may include at least a partial area where a color bleeding effect has occurred. Meanwhile, referring to FIG. 7, when the apparatus 100 receives a user input for alleviating a color bleeding effect, the apparatus 100 may obtain a corrected image 320 in which a color bleeding effect is alleviated by inputting a sketch image or black-and-white image 311 and user input data 312 to a second artificial neural network 300.

Figure 8:
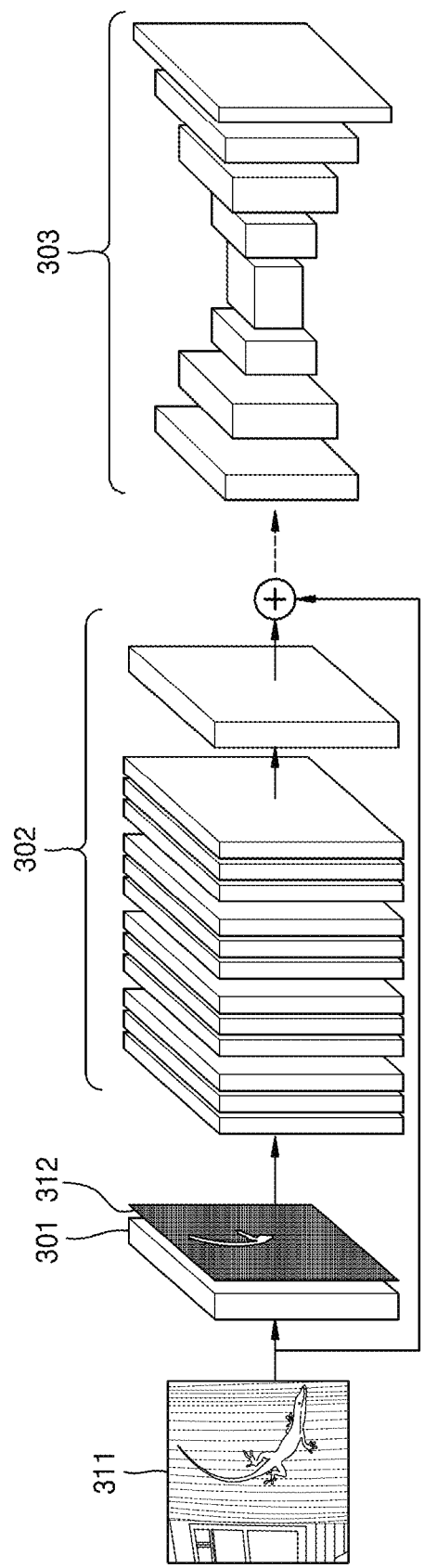
FIGS. 8 to 10 are diagrams for describing user input data according to an embodiment of the present disclosure.

Hereinafter, a second artificial neural network for generating a corrected image will be described in detail with reference to FIG. 8.

A second artificial neural network 302 according to some embodiments of the present disclosure may use output data of a first layer 301 included in the first artificial neural network 200 and the user input data 312 as input data. As a result, the second artificial neural network 302 may input to second layers 303 included in the first artificial neural network 200, output data, in which semantic edge information is enhanced. In other words, the first artificial neural network 200 including the second layers 303 receiving the output data of the second artificial neural network 302 may generate a corrected image in which a color bleeding effect occurred in a boundary at a location where user input data is received is alleviated.

Figure 9:
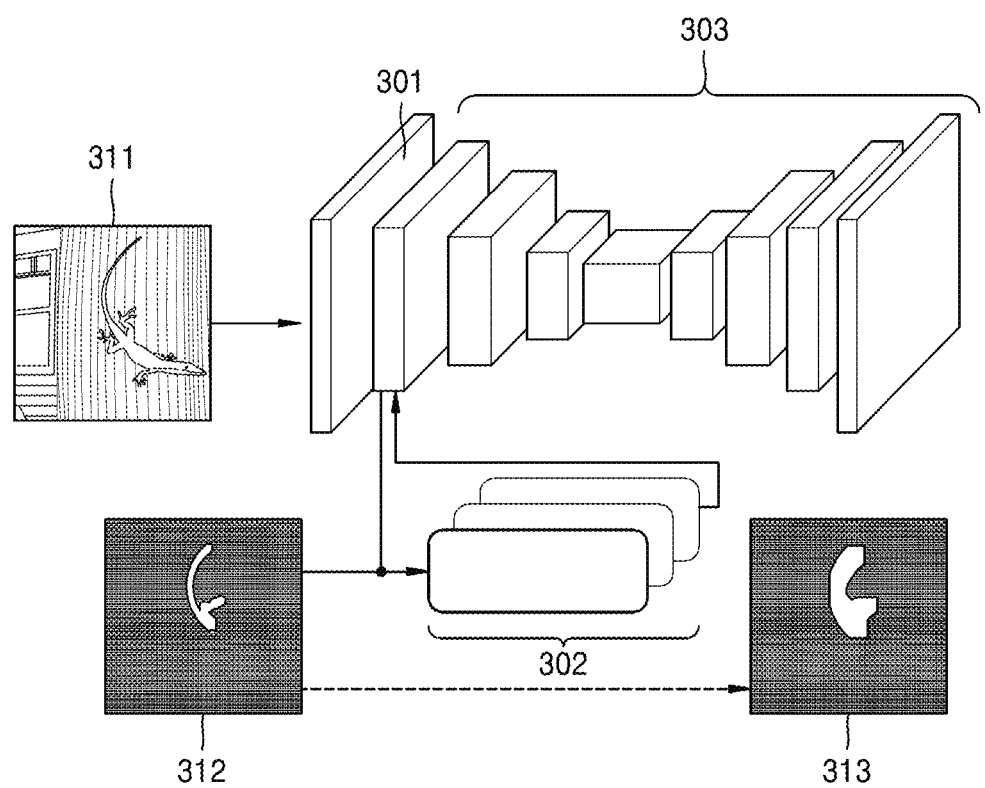
Figure 10:
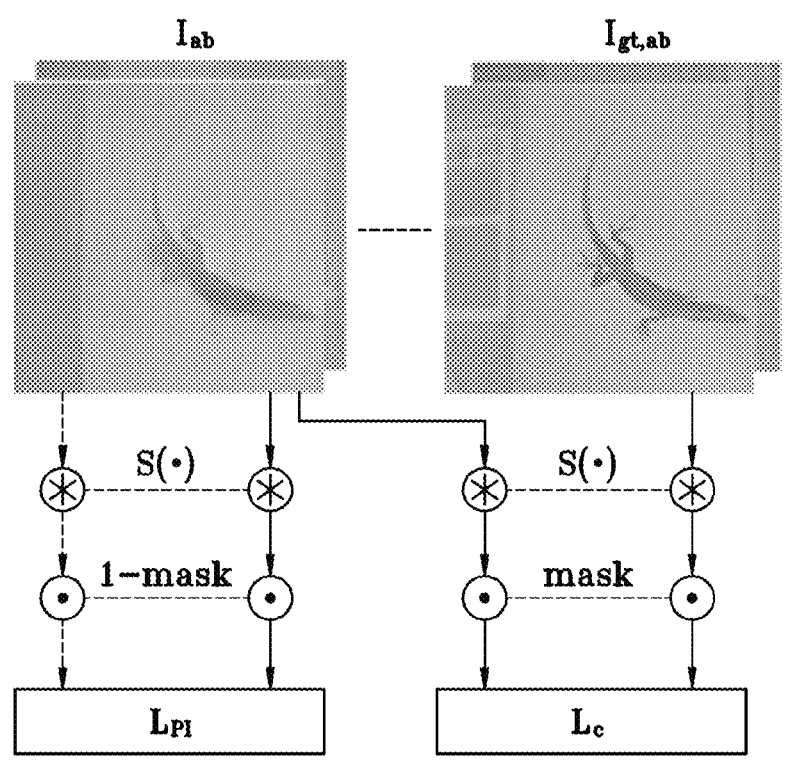

Referring to FIGS. 9 and 10, the apparatus 100 according to some embodiments of the present disclosure may use a Sobel filter to train the second artificial neural network 300. FIG. 9 illustrates a case where a Sobel filter mask 313 is generated based on the pseudo user input data 312, and FIG. 10 illustrates an example of a process of training the second artificial neural network 300. According to some embodiments of the present disclosure, the apparatus 100 may set an objective function for reducing a gap of boundary information between a first colored image lab where a color bleeding effect has occurred and a second colored image $I_{gt,ab}$ where a color bleeding effect has not occurred, the first colored image lab being generated through the first artificial neural network 200 to train the second artificial neural network 300. Referring to FIG. 10, the apparatus 100 may extract the boundary information by using the Sobel filter for channels of the first colored image lab and the second colored image $I_{gt,ab}$. Then, the second artificial neural network 300 may be trained to minimize the difference between the extracted boundaries. Referring to the illustration in FIG. 10, Lc denotes a color difference loss value, and Equations 1 to 5 below may be used to prevent unnecessary perturbation in both pixel and feature levels, wherein $L_{PI}$ denotes a pixel level inertia loss value and $L_{FI}$ denotes a feature level inertia loss value.

Equation 1 and Equation 2 are equations for obtaining a color difference loss value.

$$S(I) = \sqrt{(G_x * I)^2 + (G_y * I)^2},$$ [Equation 1]

$$G_x = \begin{pmatrix} 1 & 0 & -1 \\ 2 & 0 & -2 \\ 1 & 0 & -1 \end{pmatrix}, G_y = \begin{pmatrix} 1 & 2 & 1 \\ 0 & 0 & 0 \\ -1 & -2 & -1 \end{pmatrix}$$

$$S(I) = \sqrt{(G_x * I)^2 + (G_y * I)^2},$$

$$G_x = \begin{pmatrix} 1 & 0 & -1 \\ 2 & 0 & -2 \\ 1 & 0 & -1 \end{pmatrix}, G_y = \begin{pmatrix} 1 & 2 & 1 \\ 0 & 0 & 0 \\ -1 & -2 & -1 \end{pmatrix}$$

$$\mathcal{L}_c = \mathbb{E}_{x,y \in M}[\|S(x,y) - S_{gt}(x,y)\|_2],$$ [Equation 2]

$$S = S(I_{ab}), S_{gt} = S(I_{gt,ab})$$

$$\mathcal{L}_c = \mathbb{E}_{x,y \in M}[\|S(x,y) - S_{gt}(x,y)\|_2],$$

$$S = S(I_{ab}), S_{gt} = S(I_{gt,ab})$$

Equation 3 is an equation for obtaining a feature level inertia loss value and Equation 4 is an equation for obtaining a pixel level inertia loss value.

$$\mathcal{L}_{FI_i} = \|A_{enh_i}\|^2$$ [Equation 3]

$$\mathcal{L}_{PI} = \mathbb{E}_{x,y \notin M}[\|S(x,y) - S_0(x,y)\|_2],$$

$$S = S(I_{ab}), S_0 = S(I_{0,ab}).$$

$$\mathcal{L}_{PI} = \mathbb{E}_{x,y \notin M}[\|S(x,y) - S_0(x,y)\|_2],$$

$$S = S(I_{ab}), S_0 = S(I_{0,ab}).$$ [Equation 4]

An objective function is obtained according to Equation 5.

$$\mathcal{L}_{total} = \lambda_c \mathcal{L}_c + \sum_{i=1}^{I} \lambda_{FI_i} \mathcal{L}_{FI_i} + \lambda_{PI} \mathcal{L}_{PI}$$ [Equation 5]

Figure 11:
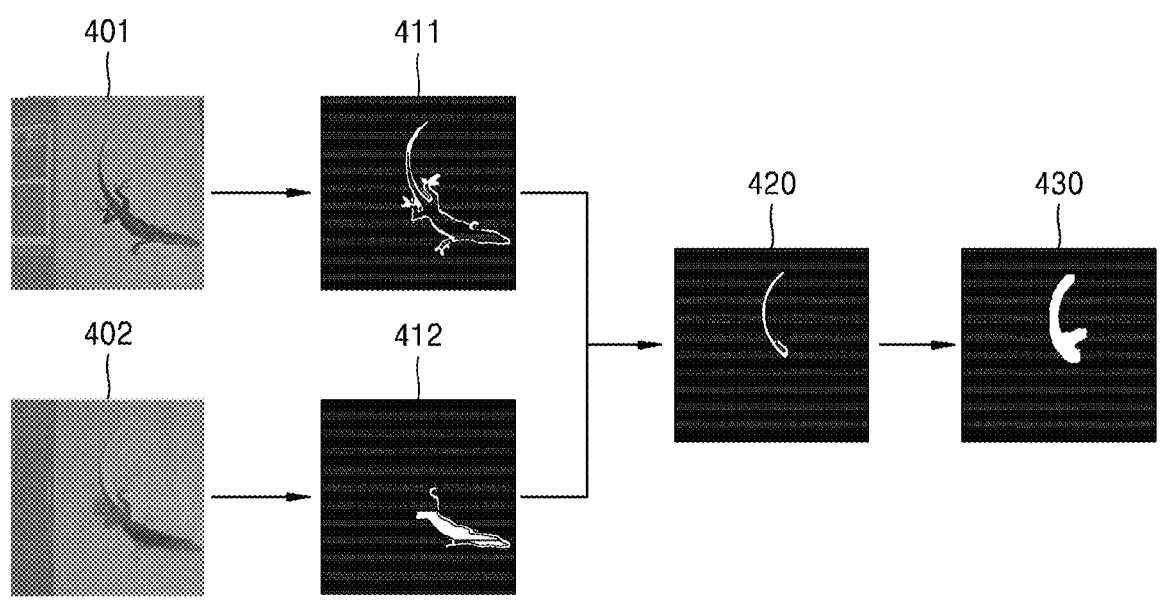
FIG. 11 is a diagram for describing a method of generating user input data, according to an embodiment of the present disclosure.

Hereinafter, a method of generating pseudo user input data will be described with reference to FIG. 11.

The apparatus 100 according to some embodiments of the present disclosure may generate the pseudo user input data to train an automatic coloring model for alleviating a color bleeding effect.

The apparatus 100 according to an embodiment of the present disclosure may detect a boundary 412 of a first colored image 402 in which a color bleeding effect has occurred and a boundary 411 of a second colored image 401 in which a color bleeding effect has not occurred, from among a plurality of colored images, and generate pseudo user input data 430 by comparing (420) the boundary of the first colored image with the boundary of the second colored image.

For example, the apparatus 100 may generate pseudo scribble input data so as to use, as training data, input data similar to an interaction provided by a user. Accordingly, the apparatus 100 may be trained to minimize a difference of boundary information of two images within an area corresponding to the scribble input data.

The method for correcting a colored image, according to an embodiment of the present disclosure, may use a cluster discrepancy ratio as a new indicator for further objectively evaluating a color bleeding effect. Here, the concept of super-pixel is introduced to group pixels having a same color and texture to an upper cluster, and the degree of difference in a cluster form between an original image and a generated image is measured. Accordingly, it may be evaluated how well colors are distinguished by using edges ad boundaries, without being limited to a specific color.

It is difficult for PSNR and LPIPS, which are two indicators for evaluating performance of an existing coloring model, to properly reflect performance of a multi-modal coloring task. In particular, these two measures evaluate that a generated image, which has a realistic edge but has a different color from an original image, has unsatisfactory performance, based on the color of the image.

Also, the method according to an embodiment of the present disclosure may use qualitative and quantitative evaluations for ImageNet 2012, Coco-stuff, Place205 data sets to evaluate performance of an artificial intelligence network. Accordingly, a color bleeding effect that occurs in existing coloring models may be effectively alleviated. In addition, excellent quantitative and qualitative evaluations may be exhibited by applying the method not only to automatic coloring of a black-and-white image, but also to automatic coloring of a sketch image.

One of ordinary skill in the art will understand that the present disclosure may be implemented in a modified form without departing from the essential features of the present disclosure. Therefore, the methods of the present disclosure should be considered in descriptive sense only and not for purposes of limitation. The scope of the present disclosure is set forth in the claims rather than the foregoing description, and all differences within the scope equivalent thereto should be construed as being included in the present disclosure.

The apparatus described above may be realized by a hardware component, a software component, and/or a combination of a hardware component and a software component. For example, the apparatus and component described in embodiments may be realized by using one or more general-purpose or special purpose processing devices, such as a processor, a controller, an arithmetic logic unit (ALU), a digital signal processor, a micro-computer, a field programmable gate array (FPGA), a programmable logic unit (PLU), a micro-processor, or any other device capable of executing and responding to an instruction. A processing device may execute an operating system (OS) and one or more software applications executed on the OS. Also, the processing device may access, store, manipulate, process, and generate data in response to execution of software. For convenience of description, it has been described that one processing device is used, but it would be obvious to one of ordinary skill in the art that the processing device may include a plurality of processing elements and/or a plurality of types of processing elements. For example, the processing device may include a plurality of processors or one processor and one controller. Also, another processing configuration, such as a parallel processor, is possible.

The software may include a computer program, a code, an instruction, or a combination thereof, and may configure the processing device to operate as desired or instruct the processing device independently or collectively. The software and/or data may be embodied, permanently or temporarily, by any type of machine, component, physical device, virtual equipment, computer storage medium or device, or transmitted signal wave, such as to be analyzed by the processing device or provided to the processing device. The software may be distributed on a computer system connected to a network, and stored or executed in a distributed manner. The software and data may be stored in one or more computer-readable recording media.

Methods according to embodiments may be recorded on a computer-readable recording medium by being implemented in the form of program commands executed by using various computers. The computer-readable recording medium may include at least one of a program command, a data file, or a data structure, independently or collectively. The program commands recorded in the computer-readable recording medium may be specially designed for an embodiment or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as ROM, RAM, and flash memory. Examples of the computer command include machine codes generated by a compiler, and high-level language codes executable by a computer by using an interpreter. The hardware device may be configured to operate as one or more software modules to perform operations of an embodiment, or vice versa.

As above, embodiments of the present disclosure have been described by the limited examples and drawings, but various changes and modifications are possible from the above description by one of ordinary skill in the art. For example, appropriate results may be achieved even when the described techniques are performed in an order different from the described method, and/or components, such as a system, a structure, a device, and a circuit, are combined or associated in a form different from the described method, or replaced by other components or equivalents.

Therefore, other implementations, other embodiments, and equivalents of claims are also within the scope of the claims described below.

The invention claimed is:

1. A method, performed by a computing device, of correcting a colored image, the method comprising:
   inputting a sketch image and color information of the sketch image to a first artificial neural network, trained using a plurality of sketch images and colored image corresponding to the plurality of sketch images, to obtain a colored image from the first neural network, the first artificial neural network determining color states of individual areas included in the sketch image based on the input color information;
   receiving user input data from a user indicating a target area in the colored image where a color bleeding effect has occurred; and
   inputting the sketch image and the user input data to a second artificial neural network to obtain a corrected color image in which the color bleeding in the target area has been alleviated,
   wherein the second artificial neural network is trained by a method comprising:
   obtaining a plurality of colored images generated based on the sketch image;
   detecting boundaries of the sketch image within each of the plurality of colored images;
   detecting a boundary of a first colored image in which a color bleeding effect has occurred and a boundary of a second colored image in which a color bleeding effect has not occurred, from among the plurality of colored images generated based on the sketch image;
   generating a pseudo user input data by comparing the boundary of the first colored image with the boundary of the second colored image and detecting a different boundary area between the boundary of the first colored image and the boundary of the second colored image, and generating Sobel filter mask data corresponding to the detected boundary area; and
   inputting the sketch image and the pseudo user input data as input data and the second colored image as target data in the second artificial neural network.

2. The method of claim 1, wherein the user input data comprises scribble input data for the target area.

3. The method of claim 1, wherein the second artificial neural network is trained such that a gap between the boundary of the first colored image and the boundary of the second colored image is minimized by using an objective function for reducing the gap.

4. The method of claim 1, wherein the boundaries of the plurality of colored images are detected by using a Sobel filter.

5. The method of claim 1, wherein the second artificial neural network comprises a convolution layer and at least some layers of the first artificial neural network, the sketch image and the user input data being input to the convolution layer, and output data of the convolution layer is input data of the at least some layers of the first artificial neural network.

6. An apparatus for correcting a colored image, comprising:
   a processor configured to perform the steps including,
   inputting a sketch image and color information of the sketch image to a first artificial neural network, trained using a plurality of sketch images and colored image corresponding to the plurality of sketch images, to obtain a colored image from the first neural network, the first artificial neural network determining color states of individual areas included in the sketch image based on the input color information;
   receiving user input data from a user indicating a target area of the colored image where a color bleeding effect has occurred, and
   inputting the sketch image and the user input data to a second artificial neural network to obtain a corrected color image in which the color bleeding in the target area has been alleviated,
   wherein the processor is configured to train the second artificial neural network by:
   obtaining a plurality of colored images generated based on the sketch image;
   detecting boundaries of the sketch image within each of the plurality of colored images;
   detecting a boundary of a first colored image in which a color bleeding effect has occurred and a boundary of a second colored image in which a color bleeding effect has not occurred, from among the plurality of colored images generated based on the sketch image;
   generating a pseudo user input data by comparing the boundary of the first colored image with the boundary of the second colored image and detecting a different boundary area between the boundary of the first colored image and the boundary of the second colored image, and generating Sobel filter mask data corresponding to the detected boundary area; and
   inputting the sketch image and the pseudo user input data as input data and the second colored image as target data in the second artificial neural network.

7. The apparatus of claim 6, wherein the processor is further configured to train the second artificial neural network such that a gap between the boundary of the first colored image and the boundary of the second colored image is minimized by using an objective function for reducing the gap.

8. The apparatus of claim 6, wherein the processor is further configured to detect the boundaries of the plurality of colored images by using a Sobel filter.

9. A non-transitory computer readable recording medium storing a computer program for executing the method of claim 1, using a computer.

* * * * *